// United States Patent //
Kuroda et al.

(10) Patent No.: US 7,026,369 B2
(45) Date of Patent: Apr. 11, 2006

(54) AQUEOUS EMULSION COMPOSITION AND ADHERENT COMPOSITION

(75) Inventors: Kenji Kuroda, Osaka (JP); Susumu Okatani, Osaka (JP); Hiroyuki Shiraki, Osaki (JP)

(73) Assignee: Mitsui Takeda Chemicals, Inc., Tokyo (JP)

( * ) Notice: Subject to any disclaimer, the term of this patent is extended or adjusted under 35 U.S.C. 154(b) by 580 days.

(21) Appl. No.: 10/199,036

(22) Filed: Jul. 22, 2002

(65) Prior Publication Data

US 2003/0036581 A1 Feb. 20, 2003

(30) Foreign Application Priority Data

Jul. 31, 2001 (JP) .................................... 2001-231991

(51) Int. Cl.
*C08F 2/50* (2006.01)
*C08F 2/16* (2006.01)

(52) U.S. Cl. ............................ 522/84; 522/85; 522/86; 522/150; 522/153; 522/154; 522/157; 522/161; 524/800; 524/801; 524/803; 524/804; 524/812; 524/845; 524/457; 524/458; 524/459; 524/460; 524/923; 524/926

(58) Field of Classification Search ................ 522/84, 522/85, 150, 153, 154, 157, 161; 524/800, 524/801, 803, 557, 812, 503, 501, 457, 458, 524/459, 460, 804, 845, 923, 926; 525/300.6; 526/304; 428/355 R, 355 EN, 355 BL, 355 AC
See application file for complete search history.

(56) References Cited

U.S. PATENT DOCUMENTS

| 3,133,040 A | 5/1964 | Silverstein et al. |
|---|---|---|
| 4,614,781 A | 9/1986 | Hori et al. ................ 525/330.6 |
| 6,548,605 B1 * | 4/2003 | Morita et al. ............ 525/330.6 |

FOREIGN PATENT DOCUMENTS

| EP | 0 517 379 | 12/1992 |
|---|---|---|
| EP | 0 924 279 | 6/1999 |
| EP | 1 106 628 | 6/2001 |

* cited by examiner

*Primary Examiner*—Sanza L. McClendon
(74) *Attorney, Agent, or Firm*—Wenderoth, Lind & Ponack, L.L.P.

(57) ABSTRACT

To provide an aqueous emulsion composition which has high adhesion strength for a wide variety of materials including molded products and affords sufficient wettability even for the object to be adhesive bonded of low surface polarity so that it can develop sufficient adhesiveness and whose emulsion is stable so satisfactorily as to provide good mechanical stability and storage stability, and to provide an adherent composition comprising the aqueous emulsion composition, at least ethylene-vinyl acetate copolymer or modified resin thereof, photo polymerization initiator, and unsaturated ethylenic monomer are mixed and dissolved or dispersed, to prepare oil drop component, followed by emulsifying the oil drop component in water by using a surface-active agent, whereby an aqueous emulsion composition, in which micelles each encapsulating at least the ethylene-vinyl acetate copolymer or modified resin thereof, the photo polymerization initiator and unsaturated ethylenic monomer are dispersed in water, is prepared.

9 Claims, No Drawings

AQUEOUS EMULSION COMPOSITION AND ADHERENT COMPOSITION

BACKGROUND OF THE INVENTION

1. Field of the Invention

The present invention relates to an aqueous emulsion composition and an adherent composition and, more particularly, to an aqueous emulsion composition and an adherent composition suitably used as a primer or adhesive.

2. Description of the Prior Art

Organic solvent adhesives are generally in wide use as an adherent composition used for adhesive bonding of a variety of molded products such as plastic films, plastic sheets, plastic foams, fibers, synthetic leathers, and metals.

The organic solvent adhesives have high adhesion strength for relatively rigid molded products, so that they are used for a variety of applications, while on the other hand, they have disadvantages of being at risk of catching fire and being not so desirable in environmental sanitation. In view of these disadvantages, in recent years, aqueous adhesives have been increasingly developed as a substitute for the organic solvent adhesives.

Adherent compositions comprising aqueous emulsion containing ethylene-vinyl acetate copolymer are known as the aqueous adhesives. For example, European unexamined patent publication bulletin of EP1106628A1 proposes an aqueous emulsion composition comprising modified carboxyl resin of saponified ethylene-vinyl acetate copolymer and surface-active agent and describes that this aqueous emulsion composition, when used as an adherent composition, provides high adhesion strength for a wide variety of materials and provides adequate adhesion even for molded products.

To be more specific, EP1106628A1 describes that modified carboxyl resin of saponified ethylene-vinyl acetate copolymer is emulsified in water by using a surface-active agent, to prepare an aqueous emulsion composition, first, and, then, unsaturated ethylenic monomer and photo polymerization initiator are optionally mixed in that aqueous emulsion composition, whereby an adherent composition having high adhesion strength is produced.

It is true that the adherent composition described in EP1106628A1 affords adhesion at higher adhesion strength than the known adherent composition comprising aqueous emulsion containing ethylene-vinyl acetate copolymer. But, since this adherent composition is produced in such a manner that after modified carboxyl resin of saponified ethylene-vinyl acetate copolymer is emulsified by using a surface-active agent, unsaturated ethylenic monomer and photo polymerization initiator of high hydrophilic nature (in other words, high polarity) are optionally mixed in the aqueous emulsion composition thus prepared, the adherent composition is insufficient in wettability for the object to be adhesive bonded or the object to be adhesive bonded of low surface polarity, in particular, for the reason of which there is the possibility that the adhesive bonding properties may be insufficiently developed. Also, since the emulsion is not stable sufficiently, there is the possibility that poor mechanical stability and poor storage stability may be caused.

SUMMARY OF THE INVENTION

It is the object of the present invention to provide an aqueous emulsion composition which has high adhesion strength for a wide variety of materials including molded products and affords sufficient wettability even for the object to be adhesive bonded of low surface polarity so that it can develop sufficient adhesive bonding properties and whose emulsion is stable so satisfactorily as to provide good mechanical stability and storage stability, and to provide an adherent composition comprising the aqueous emulsion composition.

The present invention is directed to a novel aqueous emulsion composition wherein micelles each encapsulating (involving) ethylene-vinyl acetate copolymer or modified resin thereof, photo polymerization initiator and unsaturated ethylenic monomer are dispersed in water.

The aqueous emulsion composition of the present invention is preferably produced in the process that at least the ethylene-vinyl acetate copolymer or modified resin thereof, the photo polymerization initiator, and the unsaturated ethylenic monomer are mixed and dissolved or dispersed, to prepare oil drop component, followed by emulsifying the oil drop component in water by using a surface-active agent.

In the aqueous emulsion composition according to the present invention, it is preferable that the modified resin of ethylene-vinyl acetate copolymer is a modified carboxyl resin of partly saponified ethylene-vinyl acetate copolymer.

In the aqueous emulsion composition according to the present invention, it is preferable that the photo polymerization initiator includes at least an intermolecular hydrogen pull reaction type photo polymerization initiator or includes at least an intermolecular hydrogen pull reaction type photo polymerization initiator and an intramolecular linkage fragmentation type photo polymerization initiator.

In the aqueous emulsion composition according to the present invention, it is preferable that the unsaturated ethylenic monomer is (metha) acrylate. Further, it is preferable that the (metha) acrylate comprises at least (metha) acrylate having in ester moiety thereof a hydrocarbon group containing 6–16 carbons.

In the aqueous emulsion composition according to the present invention, it is preferable that the ethylene-vinyl acetate copolymer or modified resin thereof is contained in a proportion of 3–60 parts by weight per 100 parts by weight of unsaturated ethylenic monomer and also that the photo polymerization initiator is contained in a proportion of 1–160 parts by weight per 100 parts by weight of unsaturated ethylenic monomer.

Also, the present invention is directed to a novel adherent composition comprising an aqueous emulsion composition wherein micelles each encapsulating ethylene-vinyl acetate copolymer or modified resin thereof, photo polymerization initiator and unsaturated ethylenic monomer are dispersed in water.

The aqueous emulsion composition of the present invention can be suitably used as adherent composition including primer and adhesive. The aqueous emulsion composition of the present invention has high adhesion strength for a wide variety of materials so that it can be adequately used for the adhesive bonding of a variety of molded products including, for example, plastic films, plastic sheets, plastic foams, fibers, synthetic leathers and metals. In this adherent composition, sufficient wettability is afforded even for the object to be adhesive bonded of low surface polarity so that it can develop sufficient adhesive bonding properties and further the emulsion is stable so satisfactorily as to provide improved mechanical stability and storage stability. In addition, since this adherent composition is aqueous, there is little danger of catching fire, so that good environmental sanitation is secured.

DETAILED DESCRIPTION OF THE PREFERRED EMBODIMENTS

An aqueous emulsion composition of the present invention is produced in the process that at least ethylene-vinyl acetate copolymer or modified resin thereof, photo polymerization initiator, and unsaturated ethylenic monomer are mixed and dissolved or dispersed to prepare oil drop component, first, and, then, the oil drop component thus prepared is emulsified in water by using a surface-active agent. The aqueous emulsion composition thus produced is in the state in which the micelles each encapsulating the ethylene-vinyl acetate copolymer or modified resin thereof, the photo polymerization initiator, and the unsaturated ethylenic monomer are dispersed in water.

The ethylene-vinyl acetate copolymer (hereinafter it is abbreviated to "EVA") used in the present invention can be produced by a known method such as a high-pressure method and an emulsification method. The content of the vinyl acetate used is preferably in the range of 10 to 50 weight %, or further preferably in the range of 25 to 45 weight %, as the ratio of vinyl acetate to the raw material composition. The content of vinyl acetate less than that may cause reduction of flexibility and thus reduction of adhesion at low temperature. On the other hand, the content of vinyl acetate more than that may cause reduction of heat resistance. Preferably, the EVA used has the melt index (g/10 min (190° C., 2,160 g) based on ASTM D-1238 (the melt indexes occurring in the following are all the same as this)) of 0.1–500, or further preferably 1–300.

Although no particular limitation is imposed on the modified resin of ethylene-vinyl acetate copolymer used, modified carboxyl resin of partly saponified ethylene-vinyl acetate copolymer (hereinafter it is abbreviated to "C-HEVA") is preferably used, for example. The C-HEVA can be produced in the following process, as described by Japanese Patent Publication No. Hei 5(1993)-26,802, for example. After the EVA is dissolved in organic solvent, a lower alcohol is added to that solution, first. Then, alkali alcoholate is added thereto as catalyst in the presence of a specified amount of water, for part saponification reaction (saponification degree: the order of 10–90%), to thereby produce partly saponified ethylene-vinyl acetate copolymer (hereinafter it is abbreviated to "HEVA"). The HEVA thus produced is modified by using acid such as unsaturated carboxylic acid and acid anhydride, to thereby produce the C-HEVA. Preferably, the modified carboxyl resin of the partly saponified ethylene-vinyl acetate copolymer thus produced has the hydroxyl value of 0–250 KOHmg/g and the acid value of 2–150 KOHmg/g. The hydroxyl value and acid value outside that range may cause reduction in adhesiveness, water resistance and adhesion property at low temperature.

The ethylene-vinyl acetate copolymer or modified resin thereof may each be used singly or the ethylene-vinyl acetate copolymer and modified resin thereof may both be used in combination.

The photo polymerization initiators that may be used in the present invention include, for example, intermolecular hydrogen pull reaction type photo polymerization initiators, such as benzophenone type, thioxantone type, benzyl, Michler's ketone, and camphor quinone, and intramolecular linkage fragmentation type photo polymerization initiators, such as acetophenone type, benzoinether type, and acylphosphineoxide type.

The benzophenone type photo polymerization initiators include, for example, benzophenone, o-benzoyl methyl benzoate, 4-phenyl benzophenone, 4-benzoyl-4'-methyldiphenylsulfide, 2,4,6-trimethyl benzophenone, and (4-benzoylbenzil) trimethylammoniumchloride, chlorobenzophenone, hydroxybenzophenone, methylbenzophenone, 3,3'-dimethyl-4-methoxybenzophenone, and acrylic benzophenone.

The thioxantone type photo polymerization initiators include, for example, 2- or 4-isopropylthioxantone, 2,4-diethylthioxantone and 2,4-dichlorothioxantone.

The acetophenone type photo polymerization initiators include, for example, diethoxyacetophenone, 2-hydroxy-2-methyl-1-phenylpropane-1-on (e.g. Darocur 1173 available from Ciba Specialty Chemicals), benzildimethyl ketal (e.g. Irgacure 651 available from Ciba Specialty Chemicals, Lucirin BDK available from BASF Aktiengesellshaft etc.), 1-hydroxy-cyclohexyl-phenyl-ketone (e.g. Irgacure 184 available from Ciba Specialty Chemicals), 2-methyl-2-morpholino (4-thiomethylphenyl) propane-1-on (e.g. Irgacure 907 available from Ciba Specialty Chemicals), 2-benzil-2-dimethylamino-1-(4-morpholinophenyl)-butanone (e.g. Irgacure 369 available from Ciba Specialty Chemicals), and oligomer of 2-hydroxy-2-methyl-1-[4-(1-methylvinyl)phenyl]propanone (e.g. Esacure KIP available from Fratelli Lamberti s.p.a.).

The benzoinether type photo polymerization initiators include, for example, benzoin, benzoin methylether, benzoin ethylether, benzoin isopropylether, and benzoin isobutylether.

The acylphosphineoxide type photo polymerization initiators include, for example, 2,4,6-trimethylbenzoyl diphenylphosphineoxide (e.g. Lucirin TPO available from BASF Aktiengesellshaft), bis (2,6-dimethoxybenzoyl)2,4,4-trimethylpenthyl phosphineoxide (BAPO), bis (2,4,6-trimethylbenzoyl)phenylphosphineoxide, bis (2,4,6-trimethylbenzoyl)ethylphosphineoxide, and bis (2,4,6-trimethylbenzoyl) n-butylphosphineoxide.

In addition to these, for example, methylphenylglyoxyester (Bycure 55 available from AKZO Nobel), 3,6-bis (2-morpholinoisobutyl)-9-butylcarbazole (A-Cure 3 available from Asahi Denka Kogyo) and Titanocene compound can be cited as the photo polymerization initiators that may be used.

These photo polymerization initiators may be used singly or in combination of two or more. To give actual examples, Irgacure-1700 (bis (2,6-dimethoxybenzoil)-2,4,4-trimethylpentyl phosphineoxide/2-hydroxy-2-methylphenylpropane-1-on=25/75%) and Irgacure-1800 (bis(2,6-dimethoxybenzoil)-2,4,4-trimethylpentyl phosphineoxide/1-hydroxycyclohexyl-phenylketone=25/75%) (both of which are available from Ciba Specialty Chemicals) can be cited as commercially available ones.

Of these photo polymerization initiators, the intermolecular hydrogen pull reaction type photo polymerization initiator is preferable. The intermolecular hydrogen pull reaction type photo polymerization initiator and the intramolecular linkage fragmentation type photo polymerization initiator may be used in combination. The use of the intermolecular hydrogen pull reaction type photo polymerization initiator can provide improved adhesion properties. Also, the combined use of the intermolecular hydrogen pull reaction type photo polymerization initiator and the intramolecular linkage fragmentation type photo polymerization initiator may provide improved adhesion properties. Of the intermolecular hydrogen pull reaction type photo polymerization initiators, the benzophenone type photo polymerization initiators are preferable. Of the intramolecular linkage fragmentation type photo polymerization initiators, the acetophenone type photo polymerization initiators are preferable. It is to be noted that when the intermolecular hydrogen pull reaction type photo polymerization initiator and the intramolecular linkage fragmentation type photo polymerization initiator are used in combination, 30–1 parts by weight of intramolecular linkage fragmentation type photo polymerization initiator per 1–30 parts of weight of intermolecular hydrogen pull reaction type photo polymerization initiator is preferable.

To promote photo polymerization reaction caused by the photo polymerization initiators, a variety of sensitizing agents and photo polymerization promoters may be used together with the photo polymerization initiators.

The sensitizing agents that may be used include, for example, amines, ureas, sulfur compounds, nitriles, phosphorus compounds and nitrogen compounds.

The amines that may be used include, for example, aliphatic amines, such as trimethylamine, triethylamine, ethanolamine, diethanolamine, triethanolamine and N-methyldiethanolamine, aromatic amines, such as aniline, N-methylaniline and N,N-dimethylaniline, heterocyclic amines such as piperidine, (metha) acrylates of amines, such as dimethylaminoethyl (metha) acrylate, diethylaminoethyl (metha) acrylate and acryloyl morpholine, polyester acrylates of amines, and acrylate olygomers of amines.

The ureas that may be used include, for example, allylic urea compound and o-tolyl thiourea.

The sulfur compounds that may be used include, for example, sodium diethyldithiophosphete and soluble salt of aromatic sulfinic acid.

The nitrites that may be used include, for example, N,N-di-substituted-p-aminobenzonitrile compound.

The phosphorus compounds that may be used include, for example, tri-n-butylphosphine and sodium diethyl thiophosphate.

The nitrogen compounds that may be used include, for example, Michler's ketone, N-nitrosohydroxylamine derivative and oxazoline compound.

The sensitizing agents may be used singly or in combination of two or more. Of these sensitizing agents, amines, or preferably N-methyldiethanolamine, can be cited as a preferable sensitizing agent. Although the quantity of sensitizing agent mixed may be properly selected, if other components have an acid value (for example, ethylene-vinyl acetate copolymer or modified resin thereof and chlorinated polyolefins mentioned later have a free carboxyl group), it is preferable that the quantity of sensitizing agent mixed is not less than equivalent of a free carboxyl group of the other component and also is in the range in which the photosensitization is developed in its excessive amount.

The photo polymerization promoters that may be used include, for example, dialkylaminobenzoic acid or derivative thereof (e.g. 4-dimethylaminobenzoic acid and 4-dimethylaminobenzoate), and phosphine type photo polymerization promoter (aryl phosphine such as triphenyl phosphine, and phosphine type compound such as trialkyl phosphine). The quantity of photo polymerization promoter mixed is properly selected.

The unsaturated ethylenic monomers that may be used in the present invention include, for example, monofunctional monomer, difunctional monomer and polyfunctional monomer.

The monofunctional monomers (monofunctional polymerization diluents) include, for example, heterocyclic unsaturated ethylenic compound (e.g. N-vinyl-nitrogen-contained heterocyclic compound, such as N-vinylpyrolidone, N-vinylpyridine and N-vinylcaprolactam, and heterocyclic (metha) acrylate, such as morpholine (metha) acrylate and tetrahydrofurfuryl (metha) acrylate), N-vinylformamide, N-vinylacetamide, dialkyl aminoethyl (metha) acrylate (e.g. dimethyl aminoethyl (metha) acrylate and diethyl aminoethyl (metha) acrylate), N,N'-dimethyl acrylamide, alkoxy (poly) alkylene glycol (metha) acrylate (e.g. methoxy ethylene glycol (metha) acrylate, methoxy polyethylene glycol (metha) acrylate and butoxy polyethylene glycol (metha) acrylate), alkylphenoxyethyl (metha) acrylate (e.g. nonyl phenoxyethyl (metha) acrylate), phenoxy (poly) alkylene glycol (metha) acrylate (e.g. phenoxyethyl (metha) acrylate and phenoxypolyethylene glycol (metha) acrylate), alkyl (metha) acrylate (e.g. butyl (metha) acrylate, 2-ethylhexyl (metha) acrylate, isooctyl (metha) acrylate, isodecyl (metha) acrylate, lauryl (metha) acrylate, isomyristyl (metha) acrylate, and isostearyl (metha) acrylate), cycloalkyl (metha) acrylate (e.g. cyclohexyl (metha) acrylate), aralkyl (metha) acrylate (e.g. benzyl (metha) acrylate), (metha) acrylate having crosslinked cyclic hydrocarbon group (e.g. isobornyl (metha) acrylate, dicyclopentadiene (metha) acrylate, dicyclopentenyl (metha) acrylate, tricyclodecanyl (metha) acrylate, dicyclopentenyloxyalkyl (metha) acrylate, tricyclodecanyloxyethyl (metha) acrylate and isobornyloxyethyl (metha) acrylate), hydroxyl group contained (metha) acrylate (e.g. 2-hydroxyethyl (metha) acrylate, 2-hydroxypropyl (metha) acrylate, 3-chloro-2-hydroxypropyl (metha) acrylate, 2-hydroxy-3-phenyloxypropyl (metha) acrylate, 2-(metha) acryloyloxyethyl-2-hydroxyethyl phthalate, 3-acryloyloxyglycerinmono (metha) acrylate, 2-hydroxybutyl (metha) acrylate, 4-hydroxybutyl (metha) acrylate, pentanediolmono (metha) acrylate, 2-hydroxyalkyl (metha) acryloyl phosphate, 4-hydroxycyclohexyl (metha) acrylate, neopenthyl glycol mono (metha) acrylate, polypropylene glycol, mono (metha) acrylate, and polyethylene glycol mono (metha) acrylate), poly ε-caprolactone mono (metha) acrylate, glycidyl (metha) acrylate, mono[2-(metha) acryloyloxyethyl] acid phosphate, halogen contained (metha) acrylate (e.g. trifluoroethyl (metha) acrylate, 2,2,3,3-tetrafluoropropyl (metha) acrylate, 2,2,3,4,4,4-hexafluorobutyl (metha) acrylate and perfluorooctylethyl (metha) acrylate).

The difunctional monomers (difunctional polymerization diluents) include, for example, di (metha) acrylate of 2,2-dimethyl-3-hydroxypropyl-2,2-dimethyl-3-hydroxypropionate, (polyoxy) alkylene glycol di (metha) acrylate (e.g. ethylene glycol di (metha) acrylate, diethylene glycol di (metha) acrylate, tetraethylene glycol di (metha) acrylate, polyethylene glycol di (metha) acrylate, propylene glycol di (metha) acrylate, polypropylene di (metha) acrylate, 1,4-butandiol di (metha) acrylate, 1,6-hexandiol di (metha) acrylate, neopentyl glycol di (metha) acrylate and pentanediol di (metha) acrylate), glycerin di (metha) acrylate, trimethylolpropane di (metha) acrylate, pentaerythritol di (metha) acrylate, di (metha) acrylate of bisphenol A of alkyleneoxide (ethylene oxide, propylene oxide) adduct (e.g. di (metha) acrylate of 2,2-bis (2-hydroxyethoxyphenyl) propane), di (metha) acrylate having crosslinked cyclic hydrocarbon group (e.g. di (metha) acrylate of tricyclodecane dimethylol and dicyclopentadiene di (metha) acrylate), and (metha) acrylic acid adduct of difunctinal epoxy resin (e.g. (metha) acrylic acid adduct of 2,2-bis (glycidyloxyphenyl) propane).

The polyfunctional monomers (polyfunctional polymerization diluents) include, for example, trimethylolpropane tri (metha) acrylate, trimethylolpropane trioxy tri (metha) acrylate, pentaerythritol tri (metha) acrylate, pentaerythritol tetra (metha) acrylate, dipentaerythritol hexa (metha) acrylate, tetramethylolmethane tri (metha) acrylate, tetramethylolmethane tetra (metha) acrylate, tris (acryloyloxy) isocyanurate, tri (metha) acrylate of tris (2-hydroxyethyl) isocyanurate, tri (metha) acrylate of tris (hydroxypropyl) isocyanurate, triallyl trimellitic acid and triallyl isocyanurate.

These unsaturated ethylenic monomers may be used singly or in combination of two or more. Of these unsaturated ethylenic monomers, (metha) acrylates can be cited as preferable one.

(Metha) acrylate ((metha) acrylic ester) having in ester moiety thereof a hydrocarbon group containing 6–16 carbons (including e.g. an aliphatic hydrocarbon group, an alicyclic hydrocarbon group, an aralkyl hydrocarbon group and an aromatic hydrocarbon group) is preferably used as the (metha) acrylate. To be more specific, for example, 2-ethylhexyl (metha) acrylate, isooctyl (metha) acrylate, isodecyl (metha) acrylate, lauryl (metha) acrylate, isomyristyl (metha) acrylate, cyclohexyl (metha) acrylate, benzyl (metha) acrylate, isobornyl (metha) acrylate, and dicyclopentadiene (metha) acrylate can be cited.

It is preferable that (metha) acrylate having in ester moiety thereof a hydroxyl group and a hydrocarbon group containing 2–5 carbons is used with (metha) acrylate having in ester moiety thereof a hydrocarbon group containing 6–16 carbons. The (metha) acrylates having in ester moiety thereof the hydroxyl group and the hydrocarbon group containing 2–5 carbons include, for example, 2-hydroxyethyl (metha) acrylate, 2-hydroxypropyl (metha) acrylate, 2-hydroxybutyl (metha) acrylate, 4-hydroxybutyl (metha) acrylate, and pentaerythritol tri (metha) acrylate.

The use of those (metha) acrylates can provide, in preparation of oil drop component (as will be described later), improved solubility and dispersibility of both the ethylene-vinyl acetate copolymer or derivative thereof, and the photo polymerization initiator and can further provide improved adhesiveness. The appropriate use of those (metha) acrylates in combination with the other unsaturated ethylenic monomer can provide controlled adhesiveness.

It should be noted that when the hydrophilic (metha) acrylate, such as the (metha) acrylate containing a hydroxyl group mentioned above, is added to the obtained emulsion composition at a later stage, there is the possibility that the formation of micelles dispersed in water in a good condition may be spoiled.

An aqueous emulsion composition of the present invention is produced in such a process that at least ethylene-vinyl acetate copolymer or modified resin thereof, photo polymerization initiator, and unsaturated ethylenic monomer are mixed and dissolved or dispersed to prepare oil drop component, first.

The oil drop component can be prepared, for example, by at least ethylene-vinyl acetate copolymer or modified resin thereof, and photo polymerization initiator being blended with unsaturated ethylenic monomer and being agitated and mixed, so as to be dissolved or dispersed. In the agitation and the mixture, those may be heated, for example, to 40–70° C., if required. In addition, for the purpose of improvement of solubility, other known organic solvent may be mixed properly. When such an organic solvent is mixed, the solvent is preferably distilled off at azeotropic distillation of water in the emulsification (forced emulsification) mentioned later.

It is preferable that the mixing proportion of ethylene-vinyl acetate copolymer or modified resin thereof, and unsaturated ethylenic monomer is 3–60 parts by weight, or preferably 5–40 parts by weight, of ethylene-vinyl acetate copolymer or modified resin thereof per 100 parts by weight of unsaturated ethylenic monomer. When the ethylene-vinyl acetate copolymer or modified resin thereof is mixed in the proportion more than that, the solubility and the dispersibility to unsaturated ethylenic monomer is reduced, thus incurring possible reduction of adhesiveness. On the other hand, when the ethylene-vinyl acetate copolymer or modified resin thereof is mixed in the proportion less than that, the stability of the emulsion is reduced, thus incurring possible reduction of adhesiveness, as just the same.

It is preferable that the mixing proportion of photo polymerization initiator and unsaturated ethylenic monomer is 1–160 parts by weight, or preferably 1–130 parts by weight, or not less than 15 parts by weight, in particular, of photo polymerization initiator per 100 parts by weight of unsaturated ethylenic monomer. When the photo polymerization initiator is mixed in the proportion more than that, the solubility and the dispersibility to unsaturated ethylenic monomer is reduced and the stability of the emulsion is reduced, resulting in incurring possible reduction of adhesiveness. On the other hand, when the photo polymerization initiator is mixed in the proportion less than that, possible reduction of adhesiveness may be incurred, just as the same. When the mixing proportion of the photo polymerization initiator is not less than 15 parts by weight, sufficient adherent properties can be developed, without any degreasing process.

Then, the oil drop component thus prepared is emulsified in water by using a surface-active agent to thereby produce the aqueous emulsion composition of the present invention.

The oil drop component can be emulsified in water, for example, by the surface-active agent and water being added into the oil drop component with stirring, for phase reversal of emulsion (forced emulsion).

No particular limitation is imposed on the surface-active agents used in the present invention. Known surface-active agents may be used in the present invention, including, for example, anionic surface-active agents, such as fatty acid salt, alkyl sulfate ester salt, alkyl benzene sulfate salt, alkyl sulfosuccinate salt, polyoxyalkylene alkyl ether sulfate ester salt, polyoxyalkylene alkyl ether carboxylate salt, and polyoxyalkylene alkyl ether phosphate salt, cationic surface-active agents, such as alkylamine salt and quaternary ammonium salt, and nonionic surface-active agent, such as polyoxyalkylene alkyl ether, polyoxyalkylene alkyl phenyl ether and sorbitan aliphatic acid ester.

The surface-active agent having an oxyethylene group is preferably used in the present invention. The surface-active agents having the oxyethylene group include, for example, polyoxyethylene alkyl ether sulfate ester salt, polyoxyethylene alkyl ether, polyoxyethylene alkyl phenyl ether, polyoxyethylene sorbitan aliphatic acid ester and derivatives of other polyoxyethylenes, or polyoxyethylene-surface-active agents, including reactive surface-active agent in which unsaturated ethylenic group and the like are added thereto.

These surface-active agents may be used singly or in combination of two or more. The quantity of surface-active agent mixed is not limitative, in particular, as long as it is enough to emulsify the oil drop component (for forced emulsification). For example, it is preferable that 3–50 parts by weight, or preferably 5–30 parts by weight, of the surface-active agent per 100 parts by weight of oil drop component is mixed. When the surface-active agent is mixed in the proportion less than that, there is the possibility that reduction of dispersibility may be incurred. On the other hand, when the surface-active agent is mixed in the proportion more than that, there is the possibility that reduction of adhesiveness may be incurred.

The quantity of water mixed is not limited to any particular quantity, as long as it is enough to emulsify the oil drop component (for forced emulsification). For example, 100–3,000 parts by weight, or preferably 200–2,000 parts by weight, of water per 100 parts by weight of oil drop component is preferable.

The aqueous emulsion composition thus produced is preferably prepared so that it (components other than water) can eventually have a solid content of 3–50 weight %, or preferably 5–30 weight %.

The aqueous emulsion composition thus produced is in the state in which the micelles each encapsulating at least ethylene-vinyl acetate copolymer or modified resin thereof, photo polymerization initiator and unsaturated ethylenic monomer are dispersed in water.

In the aqueous emulsion composition thus produced, the components used for improving adhesiveness, such as chlorinated polyolefin, rosins and silane coupling agent, and various kinds of additives, such as oxidation inhibitors, ultraviolet absorption agents, coloring agents, whitening agents and dyes may be properly added to the oil drop component before emulsification or the emulsion composition after emulsification, as its intended purpose and application.

The chlorinated polyolefin that may be used include, for example, chlorinated polyolefin resin itself or a mixture thereof obtained by mixing chlorinated polyolefin resin with other polymer. The chlorinated polyolefin resin used is not limited to any particular one. The chlorinated polyolefin resins that may be used include, for example, those produced by chlorinating polyolefins, such as polyethylene, polypropylene, ethylene-propylene copolymer, ethylene-propylene-diene copolymer, polybutene, ethylene-vinyl acetate copolymer, styrene-butadiene copolymer and styrene-isoprene copolymer, or by chlorinating modified polyolefins, which are modified by introducing carboxyl group, hydroxyl group and acid anhydride in those polyolefins, by a known manner.

The chlorinated polyolefin may be used singly or in combination of two or more. The quantity of chlorinated polyolefin mixed is properly selected. The chlorinated polyolefin resins produced by chlorinating polypropylene and/or polyethylene or the acid-anhydride-modified chlorinated polyolefin resin produced by modifying the chlorinated polyolefin resin by using maleic anhydride can be preferably used.

Though a chlorine content of the chlorinated polyolefin used is not limited to any particular content, a chlorine content of 15–40 weight % can provide improved adhesion to an object to be bonded comprising polyolefin.

The rosins that may be used include, for example, thermoplastic resin containing abietic acid as the main component, such as gum rosin, wood rosin, and tall oil rosin. To be more specific, for example, modified rosins, such as hydrogenerated rosin (dihydroabietic acid and tetrahydroabietic acid), disproportionation rosin, disproportionation hydrogenerated rosin and polymerized rosin (including partly polymerized rosin), rosin or modified rosins of alkylester, glycol ester, glycerin ester and pentaerythritol ester, and rosin modified polyester using rosin or modified rosin to a part of acid of polyester can be cited. The rosin modified polyester can be produced by reaction of glycidyl ester of rosin or modified rosin with a compound having carboxylic acid. The rosins may be used singly or in combination of two or more. The quantity of rosins mixed is properly selected.

The silane coupling agents that may be used include, for example, epoxy silane, amino silane and vinyl silane. The epoxy silane is preferably used. The epoxy silanes that may be used include, for example, γ-glycidoxypropyl trimethoxy silane, γ-glycidoxypropyl triethoxy silane, γ-glycidoxypropyl methyldiethoxy silane, and β-(3,4-epoxycyclohexyl) ethyltrimethoxy silane. The silane coupling agents may be used singly or in combination of two or more. The quantity of silane coupling agent mixed is properly selected.

The aqueous emulsion composition thus produced of the present invention can be suitably used as adherent composition including primer and adhesive. The aqueous emulsion composition of the present invention has high adhesion strength for a wide variety of materials so that it can be used for the adhesive bonding of a variety of molded products including, for example, plastic films, plastic sheets, plastic foams, fibers, synthetic leathers and metals.

In this adherent composition, in particular, the obtained aqueous emulsion composition is in the state in which ethylene-vinyl acetate copolymer or modified resin thereof, and photo polymerization initiator are encapsulated in each micelle in the state of being dissolved or dispersed in unsaturated ethylenic monomer and the micelles are dispersed in water. Consequently, sufficient wettability is afforded even for the object to be adhesive bonded of low surface polarity so that it can develop sufficient adhesive bonding properties. Further, the emulsion is stable so satisfactorily as to provide good mechanical stability and storage stability.

In addition, since this adherent composition is aqueous, there is little danger of catching fire, so that good environmental sanitation is secured. Further, the aqueous emulsion composition of the present invention is excellent in initial adhesion, at-low-temperature adhesion and water resistance, and thus can effectively be used in a variety of intended uses.

In use for adhesive bonding, the adherent composition of the present invention can be applied to an object to be bonded by any known way. The usage of the adherent composition of the present invention is not limited to any specific way. For example, the adherent composition of the present invention may be used as the primer used in the pretreatment of the bonding or as the adhesive. Also, the adherent composition of the present invention may be used in such a way as to be mixed in the primer or the adhesive. After applied to the object to be bonded, the adherent composition is preferably irradiated with ultraviolet light of e.g. 50–1,000 mJ/cm$^2$.

EXAMPLES

While in the following, the present invention will be described in further detail with reference to Examples and Comparative Examples, the present invention is not limited to any Examples and Comparative Examples.

Example 1

5 parts by weight of EVA (Eva Flex EV40WY (Brand name) available from Du Pont-Mitsui Polychemicals Co., Ltd., Vinyl-acetate content: 40%, Melt index: 65) and 5 parts by weight of 1-hydroxy-cyclohexyl-phenyl ketone (Photo polymerization initiator, Irgacure 184 (Brand name) available from Ciba Specialty Chemicals) were added to a mixed solution of 50 parts by weight of isooctyl acrylate and 30 parts by weight of 2-hydroxyethyl methacrylate and were heated to 50° C. with stirring to be dissolved in it and thereby an oil drop component was prepared.

Then, 25 parts by weight of polyoxyethylene alkylether sulfate ester salt surface-active agent (Emal E-27C (Brand name) available from Kao Corp.) and 885 parts by weight of ion-exchange water were added to the prepared oil drop component with stirring in a high-speed mixer (Rotation speed: 2,000 $min^{-1}$), so that they were forcibly emulsified to thereby produce an aqueous emulsion composition.

Example 2

5 parts by weight of EVA (Eva Flex EV150 (Brand name) available from Du Pont-Mitsui Polychemicals Co., Ltd., Vinyl-acetate content: 35%, Melt index: 30) and 5 parts by weight of benzyldimethyl ketal (Photo polymerization initiator, Irgacure 651 (Brand name) available from Ciba Specialty Chemicals) were added to a mixed solution of 50 parts by weight of cyclohexyl methacrylate, 30 parts by weight of 4-hydroxybutyl acrylate and 70 parts by weight of toluene and were heated to 50° C. with stirring to be dissolved in it and thereby an oil drop component was prepared.

Then, 25 parts by weight of polyoxyethylene alkylether sulfate ester salt surface-active agent (Emal E-27C (Brand name) available from Kao Corp.) and 885 parts by weight of ion-exchange water were added to the prepared oil drop component with stirring in the high-speed mixer (Rotation speed: 2,000 $min^{-1}$), so that they were forcibly emulsified. Then, the toluene remained in the system after the phase reversal of emulsion was distilled off to thereby produce an aqueous emulsion composition.

Example 3

25 parts by weight of C-HEVA (DUMILAN SD-181 (Brand name) available from Mitsui Takeda Chemicals, Inc., Hydroxyl value: OKOHmg/g; Acid value: 84 KOHmg/g; Toluene solution (Resin content: 20 weight %)) and 5 parts by weight of 1-hydroxy-cyclohexyl-phenyl ketone (Photo polymerization initiator, Irgacure 184 (Brand name) available from Ciba Specialty Chemicals) were added to a mixed solution of 50 parts by weight of isobornyl methacrylate and 30 parts by weight of 2-hydroxyethyl methacrylate and were stirred to be dissolved in it and thereby an oil drop component was prepared.

Then, 25 parts by weight of polyoxyethylene alkylether sulfate ester salt surface-active agent (Emal E-27C (Brand name) available from Kao Corp.) and 885 parts by weight of ion-exchange water were added to the prepared oil drop component with stirring in the high-speed mixer (Rotation speed: 2,000 $min^{-1}$), so that they were forcibly emulsified. Then, the toluene remained in the system after the phase reversal of emulsion was distilled off to thereby produce an aqueous emulsion composition.

Example 4

Except that benzyl methacrylate was used as a substitute for the isobornyl methacrylate used in Example 3, the same blending and operation as that of Example 3 was performed to produce an aqueous emulsion composition.

Example 5

Except that isomyristyl methacrylate was used as a substitute for the isobornyl methacrylate used in Example 3, the same blending and operation as that of Example 3 was performed to produce an aqueous emulsion composition.

Example 6

Except that isostearyl methacrylate was used as a substitute for the isobornyl methacrylate used in Example 3, the same blending and operation as that of Example 3 was performed to produce an aqueous emulsion composition.

Example 7

Except that isobutyl methacrylate was used as a substitute for the isobornyl methacrylate used in Example 3, the same blending and operation as that of Example 3 was performed to produce an aqueous emulsion composition.

Example 8

Except that 30 parts by weight of 2-hydroxyethyl methacrylate used in Example 3 was not added, the same blending and operation as that of Example 3 was performed to produce an aqueous emulsion composition.

Example 9

50 parts by weight of C-HEVA (DUMILAN SD-181 (Brand name) available from Mitsui Takeda Chemicals, Inc., Hydroxyl value: OKOHmg/g; Acid value: 84 KOHmg/g; Toluene solution (Resin content: 20 weight %)) and 30 parts by weight of benzophenone were added to a mixed solution of 50 parts by weight of isobornyl methacrylate and 30 parts by weight of 2-hydroxyethyl methacrylate and were stirred to be dissolved in it and thereby an oil drop component was prepared.

Then, 25 parts by weight of polyoxyethylene alkylether sulfate ester salt surface-active agent (Emal E-27C (Brand name) available from Kao Corp.) and 855 parts by weight of ion-exchange water were added to the prepared oil drop component with stirring in the high-speed mixer (Rotation speed: 2,000 $min^{-1}$), so that they were forcibly emulsified. Then, the toluene remained in the system after the phase reversal of emulsion was distilled off to thereby produce an aqueous emulsion composition.

Example 10

Except that 4-methylbenzophenone was used as a substitute for the benzophenone used in Example 9, the same blending and operation as that of Example 9 was performed to produce an aqueous emulsion composition.

Example 11

Except that 4-phenylbenzophenone was used as a substitute for the benzophenone used in Example 9, the same blending and operation as that of Example 9 was performed to produce an aqueous emulsion composition.

Example 12

Except that o-benzoyl methyl benzoate was used as a substitute for the benzophenone used in Example 9, the same blending and operation as that of Example 9 was performed to produce an aqueous emulsion composition.

Example 13

50 parts by weight of C-HEVA (DUMILAN SD-181 (Brand name) available from Mitsui Takeda Chemicals, Inc., Hydroxyl value: 0 KOHmg/g; Acid value: 84 KOHmg/g;

Toluene solution (Resin content: 20 weight %)), 30 parts by weight of benzophenone, and 5 parts by weight of 1-hydroxy-cyclohexyl-phenyl ketone (Photo polymerization initiator, Irgacure 184 (Brand name) available from Ciba Specialty Chemicals) were added to a mixed solution of 50 parts by weight of isobornyl methacrylate and 30 parts by weight of 2-hydroxyethyl methacrylate and were stirred to be dissolved in it and thereby an oil drop component was prepared.

Then, 25 parts by weight of polyoxyethylene alkylether sulfate ester salt surface-active agent (Emal E-27C (Brand name) available from Kao Corp.) and 850 parts by weight of ion-exchange water were added to the prepared oil drop component with stirring in the high-speed mixer (Rotation speed: 2,000 min$^{-1}$), so that they were forcibly emulsified. Then, the toluene remained in the system after the phase reversal of emulsion was distilled off to thereby produce an aqueous emulsion composition.

Example 14

50 parts by weight of C-HEVA (DUMILAN SD-181 (Brand name) available from Mitsui Takeda Chemicals, Inc., Hydroxyl value: 0 KOHmg/g;. Acid value: 84 KOHmg/g; Toluene solution (Resin content: 20 weight %)), 80 parts by weight of 4-methylbenzophenone, and 3 parts by weight of N-methyldiethanolamine were added to a mixed solution of 50 parts by weight of isobornyl methacrylate and 30 parts by weight of 2-hydroxyethyl methacrylate and were stirred to be dissolved in it and thereby an oil drop component was prepared.

Then, 25 parts by weight of polyoxyethylene alkylether sulfate ester salt surface-active agent (Emal E-27C (Brand name) available from Kao Corp.) and 802 parts by weight of ion-exchange water were added to the prepared oil drop component with stirring in the high-speed mixer (Rotation speed: 2,000 min$^{-1}$), so that they were forcibly emulsified. Then, the toluene remained in the system after the phase reversal of emulsion was distilled off to thereby produce an aqueous emulsion composition.

Comparative Example 1

25 parts by weight of polyoxyethylene alkylether sulfate ester salt surface-active agent (Emal E-27C (Brand name) available from Kao Corp.) and 885 parts by weight of ion-exchange water were added to 25 parts by weight of C-HEVA (DUMILAN SD-181 (Brand name) available from Mitsui Takeda Chemicals, Inc., Hydroxyl value: 0 KOHmg/g; Acid value: 84 KOHmg/g; Toluene solution (Resin content: 20 weight %)) with stirring in the high-speed mixer (Rotation speed: 2,000 min$^{-1}$), so that they were forcibly emulsified. Then, the toluene remained in the system after the phase reversal of emulsion was distilled off and thereby an aqueous emulsion composition was prepared.

Then, a mixed solution of 5 parts by weight of 1-hydroxy-cyclohexyl-phenyl ketone (Photo polymerization initiator, Irgacure 184 (Brand name) available from Ciba Specialty Chemicals) and 30 parts by weight of 2-hydroxyethyl methacrylate was added to the prepared aqueous emulsion composition with stirring.

Evaluation

Evaluation was made of dispersion stability and adhesiveness of the aqueous emulsion compositions obtained in Examples and Comparative Example.

1) Dispersion Stability

The aqueous emulsion compositions obtained in Examples and Comparative Example were evaluated as follows by visual observation of the ones right after the production (early stage) and the ones stored at 40° C. for seven days, the results being shown in TABLE 1.

○: Uniformly dispersed; and

X: Phase separation or precipitate was produced.

2) Adhesiveness

The aqueous emulsion compositions of Examples and Comparative Example were used as a primer for adhesive for bonding between EVA foam and a polyvinyl chloride (PVC) sheet, to make evaluations of their adhesiveness. Specifically, the following was prepared, first.

EVA foam: Sheet formed product of 150 mm×25 mm×25 mm;

PVC sheet: Sheet formed product of 150 mm×25 mm×1 mm;

Two-component polyurethane adhesive; and

Primer for PVC.

Then, the primer for PVC was applied to the PVC sheet and also the aqueous emulsion compositions of Examples and Comparative Example were applied to the EVA foams, respectively. After irradiated with ultraviolet light of 300 mJ/cm$^2$, they were adhesive bonded with each other through the two-component polyurethane adhesive. After those samples were allowed to stand at room temperature for one day, measurement was made of adhesiveness of the samples by the 180-degree peel test in accordance with JIS K 6854. The results are shown in TABLE 1. The evaluation of adhesiveness in TABLE 1 is as follows.

AA: EVA foam material destruction;

A: Adhesive strength of 40 N/cm or more;

B: Adhesive strength in the range of 20–40 N/cm; and

C: Adhesive strength of less than 20 N/cm.

TABLE 1

| Aqueous Emulsion Composition | Examples | | | | | | | | | | | | | | Compra Ex. |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 |
| EVA | | | | | | | | | | | | | | | |
| Eva Flex EV40WY | 5 | | | | | | | | | | | | | | |
| Eva Flex EV150 | | 5 | | | | | | | | | | | | | |
| C-HEVA | | | | | | | | | | | | | | | |
| DUMILAN SD-181 | | | 25 | 25 | 25 | 25 | 25 | 25 | 50 | 50 | 50 | 50 | 50 | 50 | 25 |

TABLE 1-continued

| Aqueous Emulsion Composition | Examples | | | | | | | | | | | | | | Compra Ex. |
| --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 | 1 |
| Photo polymerization initiator | | | | | | | | | | | | | | | |
| Irgacure 184 | 5 | | 5 | 5 | 5 | 5 | 5 | 5 | | | | | 5 | | 5 (Added later) |
| Irgacure 651 | | 5 | | | | | | | | | | | | | |
| Benzophenone | | | | | | | | | 30 | | | | 30 | | |
| 4-methylbenzophenone | | | | | | | | | | 30 | | | | 80 | |
| 4-phenylbenzophenone | | | | | | | | | | | 30 | | | | |
| o-benzoyl methyl benzoate | | | | | | | | | | | | 30 | | | |
| Unsaturated etylenic monomer | | | | | | | | | | | | | | | |
| Isooctyl acrylate | 50 | | | | | | | | | | | | | | |
| Cyclohexyl methacrylate | | 50 | | | | | | | | | | | | | |
| Isobornyl methacrylate | | | 50 | | | | | 50 | 50 | 50 | 50 | 50 | 50 | 50 | |
| Benzil methacrylate | | | | 50 | | | | | | | | | | | |
| Isomyristyl acrylate | | | | | 50 | | | | | | | | | | |
| Isostearyl acrylate | | | | | | 50 | | | | | | | | | |
| Isobutyl methacrylate | | | | | | | 50 | | | | | | | | |
| 2-hydroxyethyl methacrylate | 30 | | 30 | 30 | 30 | 30 | 30 | | 30 | 30 | 30 | 30 | 30 | 30 | 30 (Added later) |
| 4-hydroxybutyl acrylate | | 30 | | | | | | | | | | | | | |
| sensitizing agent | | | | | | | | | | | | | | | |
| N-methyldiethanolamine | | | | | | | | | | | | | | 3 | |
| Surface-active agent | | | | | | | | | | | | | | | |
| Emal E27C | 25 | 25 | 25 | 25 | 25 | 25 | 25 | 25 | 25 | 25 | 25 | 25 | 25 | 25 | 25 |
| Ion-exchange water | 885 | 885 | 885 | 885 | 885 | 885 | 885 | 885 | 855 | 855 | 855 | 855 | 850 | 802 | 885 |
| Dispersion stability | | | | | | | | | | | | | | | |
| Early stage | ○ | ○ | ○ | ○ | ○ | ○ | ○ | ○ | ○ | ○ | ○ | ○ | ○ | ○ | ○ |
| 40° C. × 7 days storage | ○ | ○ | ○ | ○ | ○ | ○ | ○ | ○ | ○ | ○ | ○ | ○ | ○ | ○ | X |
| Adhesiveness | A | A | A | A | A | B | B | B | AA | AA | AA | AA | AA | AA | C |

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. An aqueous emulsion composition wherein micelles each encapsulating an ethylene-vinyl acetate copolymer or a modified resin thereof, a photo polymerization initiator and an unsaturated ethylenic monomer are dispersed in water, which is produced by a process wherein at least the ethylene-vinyl acetate copolymer or modified resin thereof, the photo polymerization initiator, and the unsaturated ethylenic monomer are mixed and dissolved or dispersed, to prepare an oil drop component, followed by emulsifying the oil drop component in water by using a surface-active agent.

2. The aqueous emulsion composition according to claim 1, wherein the modified resin of ethylene-vinyl acetate copolymer is a modified carboxyl resin of partly saponified ethylene-vinyl acetate copolymer.

3. The aqueous emulsion composition according to claim 1, wherein the photo polymerization initiator includes at least an intermolecular hydrogen pull reaction type photo polymerization initiator.

4. The aqueous emulsion composition according to claim 3, wherein the photo polymerization initiator includes at least an intermolecular hydrogen pull reaction type photo polymerization initiator and an intramolecular linkage fragmentation type photo polymerization initiator.

5. The aqueous emulsion composition according to claim 1, wherein the unsaturated ethylenic monomer is (metha) acrylate.

6. The aqueous emulsion composition according to claim 5, wherein the (metha) acrylate comprises at least (metha) acrylate having in an ester moiety thereof a hydrocarbon group containing 6–16 carbons.

7. The aqueous emulsion composition according to claim 1, wherein the ethylene-vinyl acetate copolymer or modified resin thereof is contained in a proportion of 3–60 parts by weight per 100 parts by weight of unsaturated ethylenic monomer.

8. The aqueous emulsion composition according to claim 1, wherein the photo polymerization initiator is contained in a proportion of 1–160 parts by weight per 100 parts by weight of unsaturated ethylenic monomer.

9. An adherent composition comprising an aqueous emulsion composition wherein micelles each encapsulating an ethylene-vinyl acetate copolymer or a modified resin thereof, a photo polymerization initiator and an unsaturated ethylenic monomer are dispersed in water, which is produced by a process wherein at least the ethylene-vinyl acetate copolymer or modified resin thereof, the photo polymerization initiator, and the unsaturated ethylenic monomer are mixed and dissolved or dispersed, to prepare an oil drop component, followed by emulsifying the oil drop component in water by using a surface-active agent.

* * * * *